(12) United States Patent
Brey

(10) Patent No.: US 10,220,664 B1
(45) Date of Patent: Mar. 5, 2019

(54) TRACKLESS TRAIN WITH CROSSWISE STEERING COUPLINGS BETWEEN AXLES AND CARS

(71) Applicant: Arden L. Brey, Orange Park, FL (US)

(72) Inventor: Arden L. Brey, Orange Park, FL (US)

(*) Notice: Subject to any disclaimer, the term of this patent is extended or adjusted under 35 U.S.C. 154(b) by 0 days.

(21) Appl. No.: 15/722,031

(22) Filed: Oct. 2, 2017

(51) Int. Cl.
- *B60G 5/02* (2006.01)
- *B60G 9/02* (2006.01)
- *B62D 13/04* (2006.01)

(52) U.S. Cl.
CPC ............ *B60G 9/022* (2013.01); *B60G 5/02* (2013.01); *B62D 13/04* (2013.01); *B60G 2300/04* (2013.01)

(58) Field of Classification Search
CPC ........... B60G 9/022; B60G 5/02; B62D 13/04
See application file for complete search history.

(56) References Cited

U.S. PATENT DOCUMENTS

| | | | | |
|---|---|---|---|---|
| 642,394 A * | 1/1900 | Watkins | ........... | B60D 1/173 280/102 |
| 1,242,223 A * | 10/1917 | Mueller | ........... | B62D 13/02 280/102 |
| 1,925,712 A * | 9/1933 | Campbell, Jr. | ........ | B62D 13/04 280/124.17 |
| 2,092,683 A * | 9/1937 | Stidham | ........... | B62D 13/04 280/443 |
| 2,124,947 A * | 7/1938 | Henderson | ............ | B62D 13/00 16/44 |
| 3,105,704 A * | 10/1963 | Schramm | ............ | B60P 1/027 280/405.1 |
| 3,575,444 A * | 4/1971 | Veenema | ........... | B62D 53/0864 280/408 |
| 3,620,549 A * | 11/1971 | Miller | ............ | B62D 13/06 280/445 |
| 4,208,063 A * | 6/1980 | Baker | ............ | B62D 13/06 280/445 |
| 4,262,920 A * | 4/1981 | Mettetal | ........... | B62D 53/00 280/408 |
| 4,295,659 A * | 10/1981 | Mergen | ........... | B62D 63/08 280/405.1 |
| 4,405,147 A * | 9/1983 | Horsman | ........... | B60D 1/06 280/442 |
| 4,451,058 A * | 5/1984 | Curry | ............ | B62D 13/04 280/443 |
| 4,720,119 A * | 1/1988 | Ritter | ............ | B62D 13/04 280/419 |
| 5,090,719 A * | 2/1992 | Hanaoka | ........... | B62D 13/04 280/408 |
| 6,308,976 B1 * | 10/2001 | Mitchell | ........... | B62D 13/04 280/419 |

(Continued)

*Primary Examiner* — Kevin Hurley
*Assistant Examiner* — Michael R Stabley
(74) *Attorney, Agent, or Firm* — Mark Young, P.A.

(57) ABSTRACT

A trackless train with complementary steering couplings between axles and cars transmits steering forces from one axle to the next, in succession. Couplings couple axles of cars, as well as adjacent axles between adjacent cars. Each axle assembly may either pivot about a central bearing or include a pivoting steering arm for each wheel that pivots about a steering pin, with wheels on the inside of a turn pivoting more than wheels on the outside of a turn. Differentials may be provided to transfer power to each wheel, including from car to car.

1 Claim, 18 Drawing Sheets

(56) References Cited

U.S. PATENT DOCUMENTS

| | | | | |
|---|---|---|---|---|
| 6,592,132 B2 * | 7/2003 | Bidwell | .................. | B62B 3/001 280/47.11 |
| 7,571,916 B2 * | 8/2009 | Skiles | .................... | B62D 13/02 180/24.01 |
| 7,874,571 B2 * | 1/2011 | Frey | ........................ | B60G 3/14 280/442 |
| 7,926,833 B2 * | 4/2011 | Hellbusch | .............. | B62D 13/02 180/24.01 |
| 8,011,684 B2 * | 9/2011 | Abel | ........................ | B60D 1/24 280/442 |
| 8,302,728 B1 * | 11/2012 | Dotson | ................ | A63H 17/262 180/408 |

\* cited by examiner

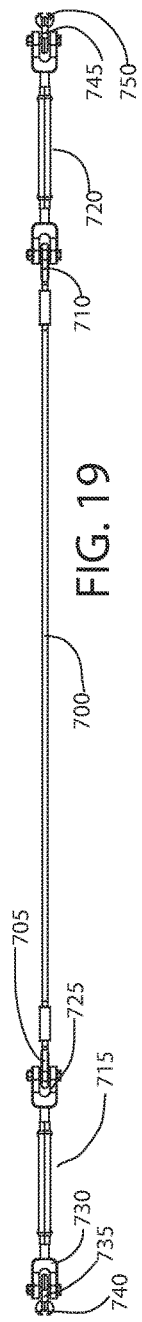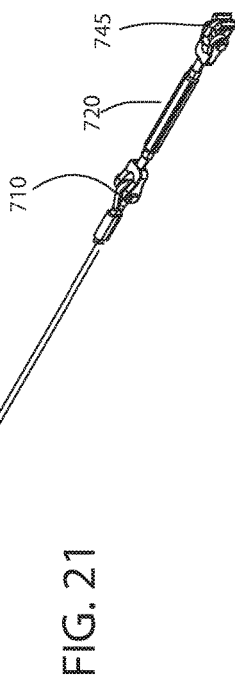
FIG. 19
FIG. 20
FIG. 21

TRACKLESS TRAIN WITH CROSSWISE STEERING COUPLINGS BETWEEN AXLES AND CARS

FIELD OF THE INVENTION

This invention relates generally to utility trams, and, more particularly, to a trackless train with crosswise steering couplings between axles and cars.

BACKGROUND

Many industries utilize an articulated vehicle with prime mover or tractor unit for transporting people, items or materials. Such vehicles typically include a heavy-duty towing unit that serves as a prime mover, providing motive power for hauling a series of trailing carts or carriages. The towing unit pulls the articulated carriages in the manner of a locomotive hauled railway train. The towing unit may be powered by an internal combustion engine, electric motor or hybrid. The towing unit is typically steered through the front wheels by a steering wheel operated by a human driver, and powered by its rear single or double axle. The towed carriages are then steered through drawbar couplings between the carriages. Some carriages may have steerable front wheels, while others may have steerable front and rear wheels.

A problem with such articulated vehicles is tracking, stability and control. Only the drawbar transmits forces to the carriage to indirectly cause the carriage to steer. The drawbar is not linked to the wheel movement components of a carriage. Consequently, the carriages tend to deviate from the path of the towing unit. Additionally, the carriages do not respond well to sharp turns of the towing unit. Furthermore, steering by essentially dragging a carriage through turns accelerates tire wear.

Another problem with such articulated vehicles is that the carriages do not provide any motive power. The carriages are pulled. Their wheels provide no torque. This compromises performance (e.g., traction and acceleration) on uneven terrain, when moving heavy loads, and on slick surfaces, such as in inclement weather.

What is needed is an articulated vehicle with carriages having wheels that steer to follow the path of the vehicle ahead, and optionally, differentials supplying torque to each wheel.

The invention is directed to overcoming one or more of the problems and solving one or more of the needs as set forth above.

SUMMARY OF THE INVENTION

To solve one or more of the problems set forth above, in an exemplary implementation of the invention, a trackless train with crosswise steering couplings between axles and cars is provided. The crosswise (e.g., criss-cross) couplings transmit steering forces from one axle to the next, in succession, with each force being transmitted to the opposite side of each succeeding axis. The couplings couple axles of a vehicle (referred to herein as a unit, cart or carriage), as well as adjacent axles between adjacent units.

In one embodiment, each axle assembly pivots about a central bearing or pivot joint. Such an embodiment is referred to as a swing or pivot axle configuration. In this embodiment, the central axis of rotation of each wheel of an axle assembly remains aligned, and the entire axle assembly pivots about the central pivot joint. Adjacent axles between coupled units of a train (e.g., the rear axle of cart 1 and front axle of cart 2) are coupled together using pivoting crosswise couplings.

In another embodiment, each axle assembly includes a steering arm for each wheel that pivots about a steering pin or joint. In this embodiment, the left and right steering arms may be joined by a coupling (e.g., a tie rod and/or steering rod), which allows the left and right steering arms to pivot through different radii of curvature, with a greater radius for the wheel on the outside of the turn and a smaller radius for the wheel on the inside of the turn. Front and rear axles of a unit are coupled using pivoting crosswise couplings. Additionally, adjacent axles between coupled units of a train (e.g., the rear axle of cart 1 and front axle of cart 2) are coupled together using pivoting crosswise couplings.

In another embodiment, differentials are provided to transfer power to each axle of each unit. A drift shaft with universal joints transfers power between adjacent differentials of adjacent units. Universal joints accommodate pivoting rotation of the axle assemblies or steering arms, while supplying power to at least one wheel, preferably both wheels, of each axle assembly.

BRIEF DESCRIPTION OF THE DRAWINGS

The foregoing and other aspects, objects, features and advantages of the invention will become better understood with reference to the following description, appended claims, and accompanying drawings, where:

FIG. 19 provides a plan view of an exemplary cable assembly for an axle assembly with a plurality of steering arms, differentials and drive shafts for a trackless train vehicle according to principles of the invention; and FIG. 20 provides a side view of an exemplary cable assembly for an axle assembly with a plurality of steering arms, differentials and drive shafts for a trackless train vehicle according to principles of the invention; and FIG. 21 provides a perspective view of an exemplary cable assembly for an axle assembly with a plurality of steering arms, differentials and drive shafts for a trackless train vehicle according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
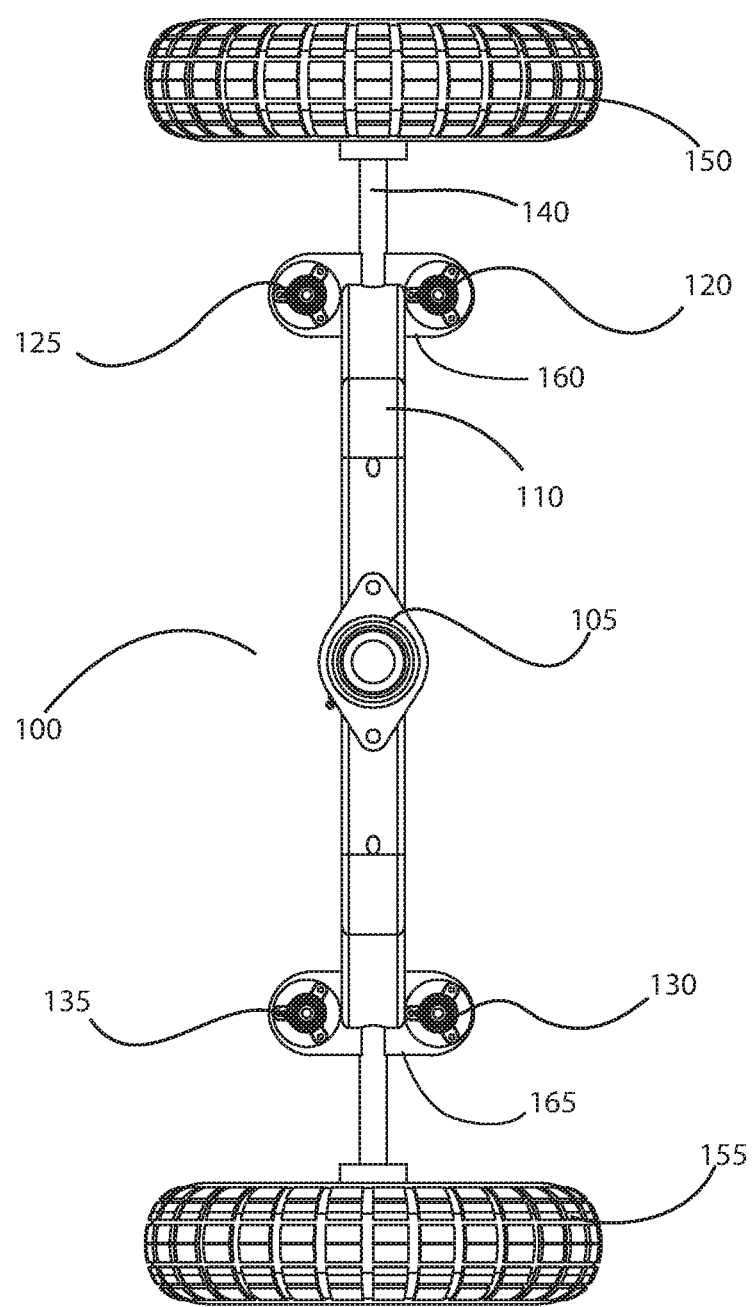
FIG. 1 provides a plan view of an exemplary axle assembly for a trackless train vehicle according to principles of the invention.

FIG. 1 provides a plan view of an exemplary pivoting axle assembly 100 for a trackless train vehicle according to principles of the invention. The exemplary axle assembly 100 includes a shaft 140, which may be fixed (as in a spindle) or rotating. In the former, a bearing or bushing sits inside a central hole in each wheel 150, 155 to allow the wheel 150, 155 to rotate around the fixed shaft. In the latter, the wheels 150, 155 may be fixed to the shaft 140, rotating with the shaft 140. A pair of mounts 160, 165 support pivoting joints 120, 125, 130, 135. Each pivoting joint 120, 125, 130, 135 may couple to a cross member which imparts steering motion to the axle assembly from an adjacent axle and transmits steering motion to an adjacent axle assembly. Each joint 105, 120, 125, 130, 135 may comprise a hinge joint, such as a pivot pin, or a ball joint that consists of a bearing stud and socket enclosed in a casing, or some other joint that allows pivoting rotation in at least one plane, i.e., at least about one axis.

Figure 2:
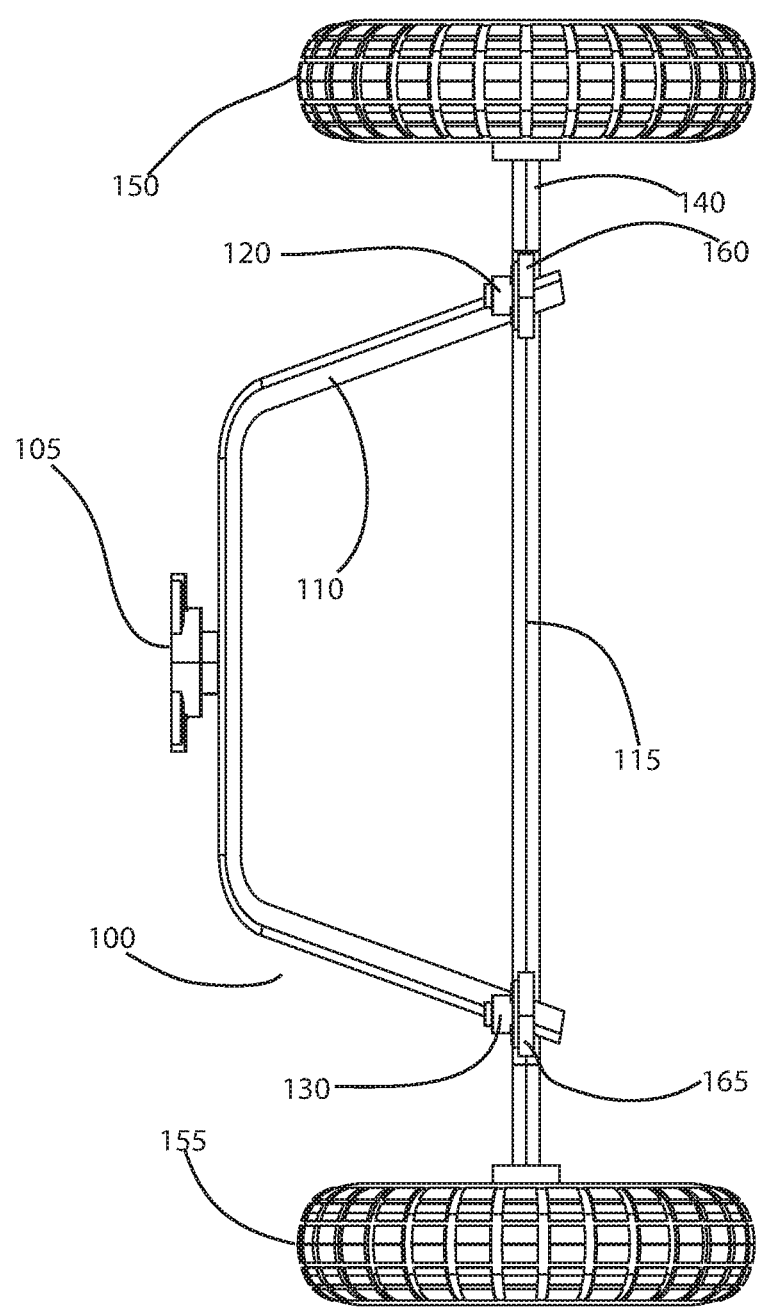
FIG. 2 provides a side view of an exemplary axle assembly for a trackless train vehicle according to principles of the invention.
Figure 3:
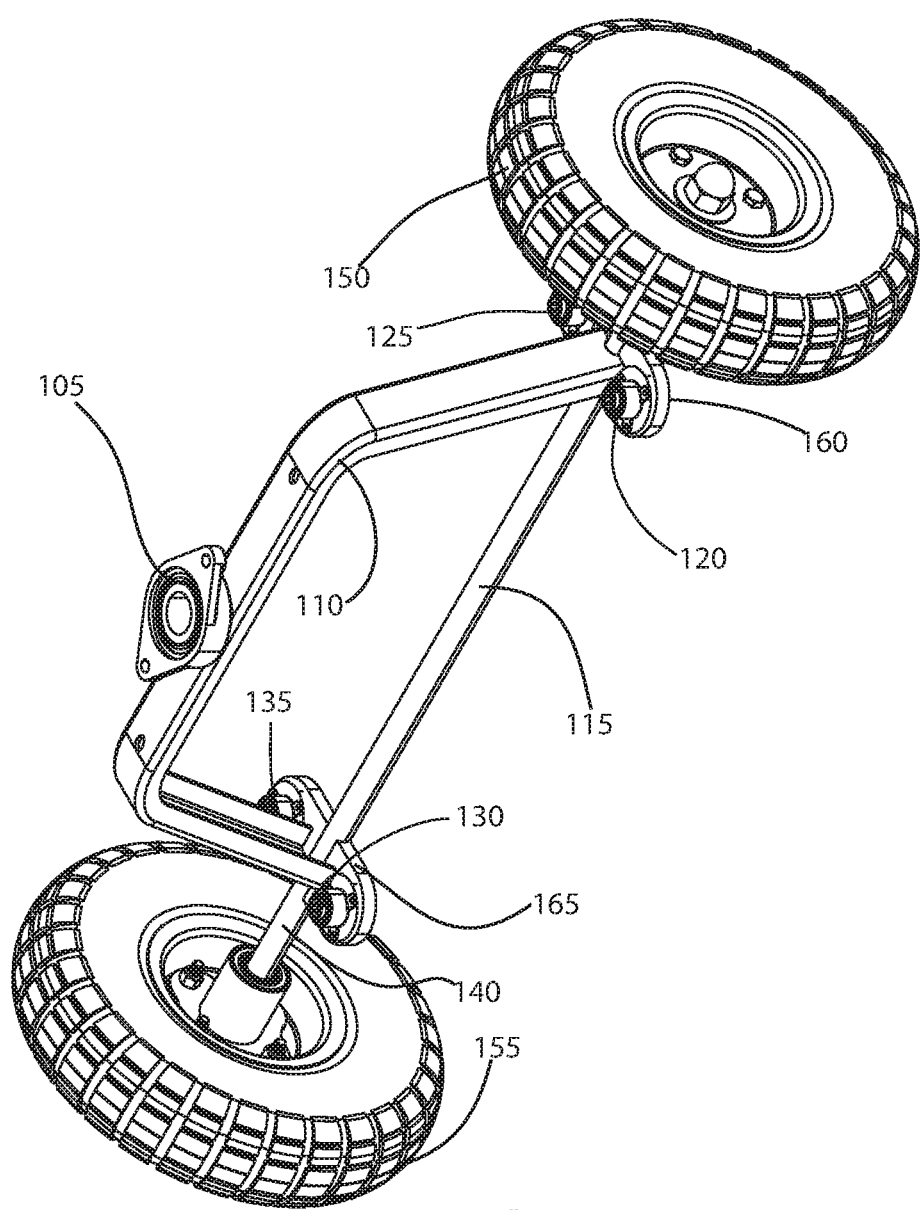
FIG. 3 provides a perspective view of an exemplary axle assembly for a trackless train vehicle according to principles of the invention.

As shown in the side and perspective views of FIGS. 2 and 3, the axle assembly includes a support 110 that couples a central pivot joint 105 to the shaft housing 115. The support 110 maintains the central pivot joint 105 at a determined elevation above the shaft 140 and wheels 150, 155, to provide clearance. The shaft housing 115 comprises a tube that contains the rotating shaft 140. If the shaft 140 is a fixed spindle about which the wheels 150, 155 rotate, then a shaft housing 115 may not be needed. The central pivot joint 105 allows pivoting of the axle assembly 100, for steering, relative to the supported body of a cart.

Figure 4:
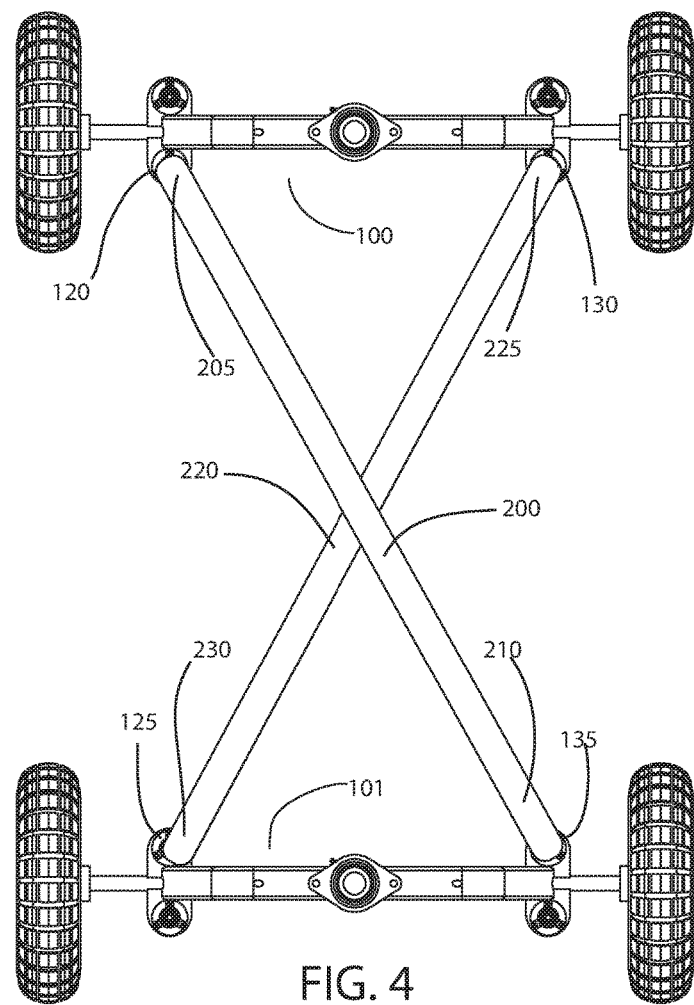
FIG. 4 provides a plan view of an exemplary pair of coupled axle assemblies for a trackless train vehicle according to principles of the invention.
Figure 5:
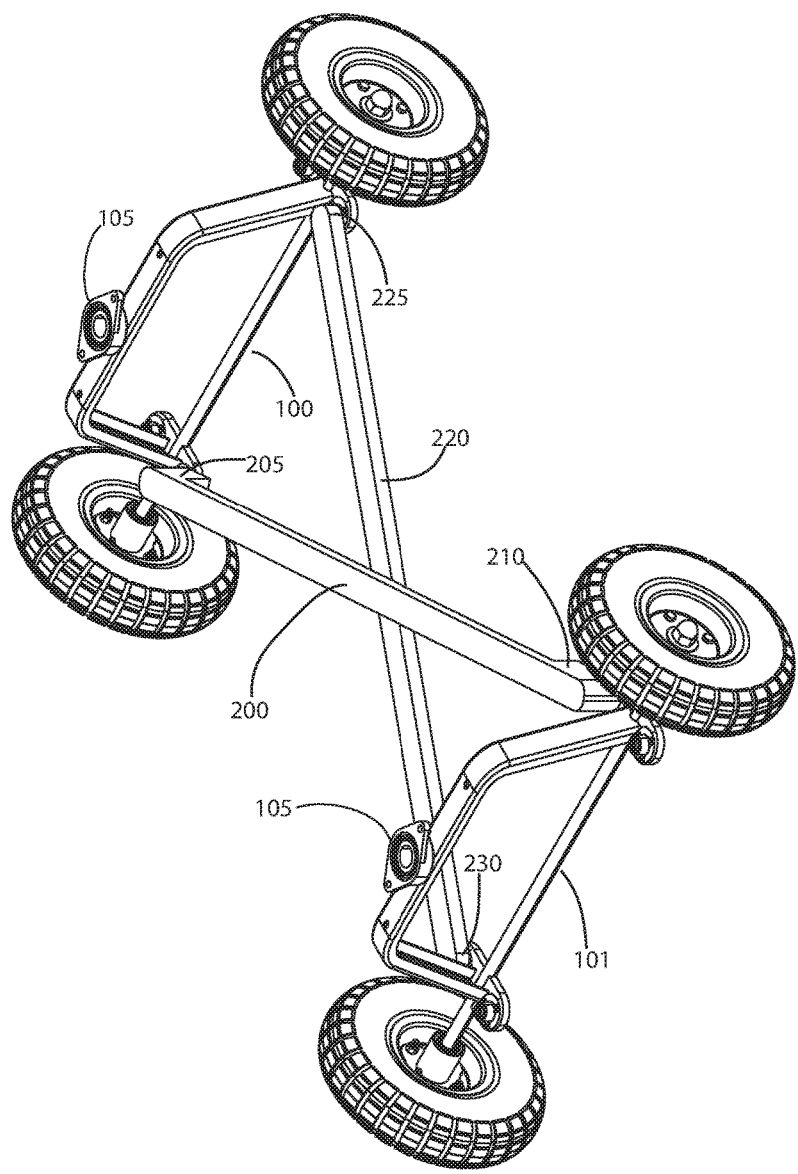
FIG. 5 provides a perspective view of an exemplary pair of coupled axle assemblies for a trackless train vehicle according to principles of the invention.
Figure 6:
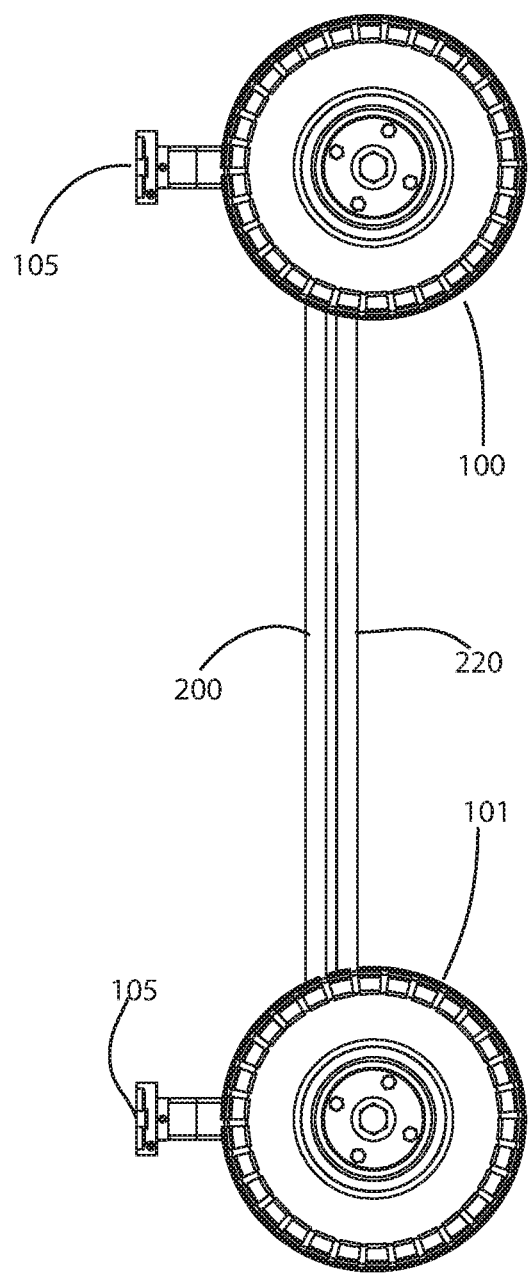
FIG. 6 provides a side view of an exemplary pair of coupled axle assemblies for a trackless train vehicle according to principles of the invention.

With reference to FIGS. 4, 5 and 6, an exemplary pair of coupled axles 100, 101 is illustrated. Two axle assemblies 100, 101 are coupled by cross members 200, 220, i.e., intra-cart cross members. Each intra-cart cross member 200, 220, includes opposite coupling ends 205, 210, 225, 230 that connect to pivoting joints 120, 130, 125, 135. The joints include bearings to facilitate pivoting rotation. By way of example but not limitation, each joint may comprise a bearing flange block or a pillow block, and the mating end of a coupling may include a flange mounting surface or a pivot pin sized and shaped to be received in the pillow block. Other rotating joints, including pivot pins without bearings, may be utilized without departing from the scope of the invention. Each of the pair of cross members 200, 220 is at a different elevation from the other cross member to avoid interference. Thus, cross member 200 couples joint 120 of axle assembly 100 to joint 135 of axle assembly 101. Likewise, cross member 220 couples joint 125 of axle assembly 100 to joint 130 of axle assembly 101. In this manner, the distance between the coupled joints is maintained and each axle assembly pivots about its central pivot joint by an equal amount (degrees) but in opposite directions.

The central pivot joint 105 of each axle assembly is coupled to the body of the vehicle. The central pivot joint 105 is a rotating joint, such as a bearing flange block which can be attached to a structural surface of the body of the vehicle by a flange. The bearing facilitates pivoting rotation of the axle assembly about the central pivot joint 105.

Figure 7:
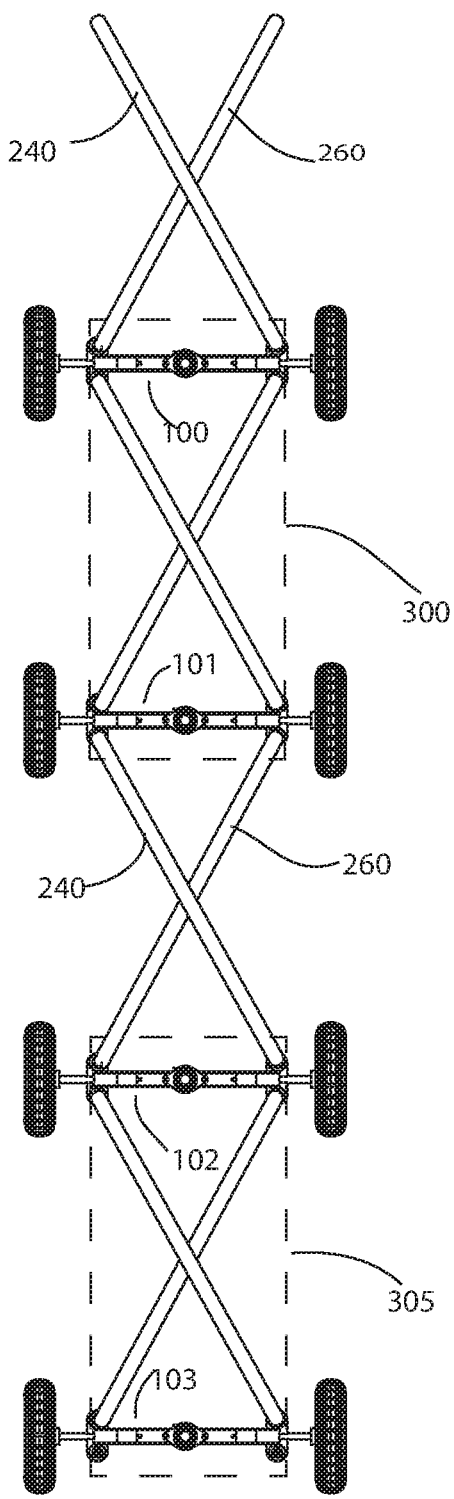
FIG. 7 provides a plan view of an exemplary train of coupled axle assemblies for a trackless train vehicle according to principles of the invention.
Figure 8:
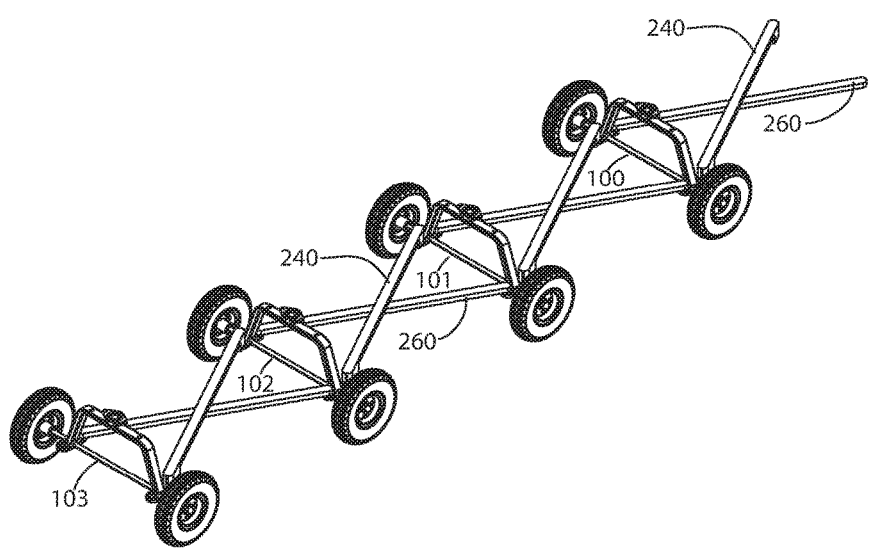
FIG. 8 provides a perspective view of an exemplary train of coupled axle assemblies for a trackless train vehicle according to principles of the invention.

The joints 120, 125 and 130, 135 are arranged in pairs, with 120 and 130 being equidistant from the central joint 105 and on the same side of the axle assembly, and 125 and 135 also being equidistant from the central joint 105 but on the opposite side of the axle assembly 100. In this manner, cross members may couple an axle assembly to two axle assemblies, to one axle assembly fore and another axle assembly aft. By way of example, as illustrated in FIG. 7, axle assembly 101 of cart 300 is coupled to axle assembly 100, also of cart 300, by intra-cart cross members 200, 220. Axle assembly 101 of cart 300 is coupled to axle assembly 102 of cart 301, by inter-cart cross members 240, 260. In this manner, a series of axle assemblies for a series of carts may be interconnected in a train.

Criss-crossing (i.e., crosswise) inter-cart cross members 240, 260 are key, as they transmit equal but opposite direction pivoting to an axle assembly of a succeeding cart. Thus, the right side of a rear axle assembly is coupled to the left side of a front axle assembly of a succeeding cart. The left side of a rear axle assembly is coupled to the right side of a front axle assembly of a succeeding cart. The radial distance from the longitudinal axis of rotation of the central pivot joint of the rear axle assembly and the point at which the coupling attaches to the right side of the rear axle assembly is the same as the radial distance from the longitudinal axis of rotation of the central pivot joint of the front axle assembly and the point at which the coupling attaches to the left side of the front axle assembly. Likewise, the radial distance from the longitudinal axis of rotation of the central pivot joint of the rear axle assembly and the point at which the coupling attaches to the left side of the rear axle assembly is the same as the radial distance from the longitudinal axis of rotation of the central pivot joint of the front axle assembly and the point at which the coupling attaches to the right side of the front axle assembly. This ensures pivoting rotation of the front axle assembly and the coupled rear axle assembly, by equal degrees of rotation but in opposite directions.

Criss-crossing intra-cart cross members 200, 220 are also key, as they transmit equal but opposite direction pivoting from a front axle assembly to a rear axle assembly of a cart. Thus, the right side of a rear axle assembly is coupled to the left side of a front axle assembly of the cart. The left side of a rear axle assembly is coupled to the right side of a front axle assembly of the cart. The radial distance from the longitudinal axis of rotation of the central pivot joint of the rear axle assembly and the point at which the coupling attaches to the right side of the rear axle assembly is the same as the radial distance from the longitudinal axis of rotation of the central pivot joint of the front axle assembly and the point at which the coupling attaches to the left side of the front axle assembly. Likewise, the radial distance from the longitudinal axis of rotation of the central pivot joint of the rear axle assembly and the point at which the coupling attaches to the left side of the rear axle assembly is the same as the radial distance from the longitudinal axis of rotation of the central pivot joint of the front axle assembly and the point at which the coupling attaches to the right side of the front axle assembly. This ensures pivoting rotation of the front axle assembly and the coupled rear axle assembly, by equal degrees of rotation but in opposite directions, for the cart.

When the front axle assembly of one cart is coupled to the rear axle of an adjacent cart using inter-cart cross members, pivoting rotation of the rear axle assembly causes pivoting rotation of the front axle assembly, by an equal amount (e.g., degrees or radians, but in an opposite direction). Likewise, when the front axle assembly of one cart is coupled to the rear axle of the same cart using intra-cart cross members, pivoting rotation of the front axle assembly causes pivoting rotation of the rear axle, by an equal amount (e.g., degrees or radians, but in an opposite direction). In this manner, rotation of each axle assembly causes rotation of each successive coupled axle assembly.

Figure 9:
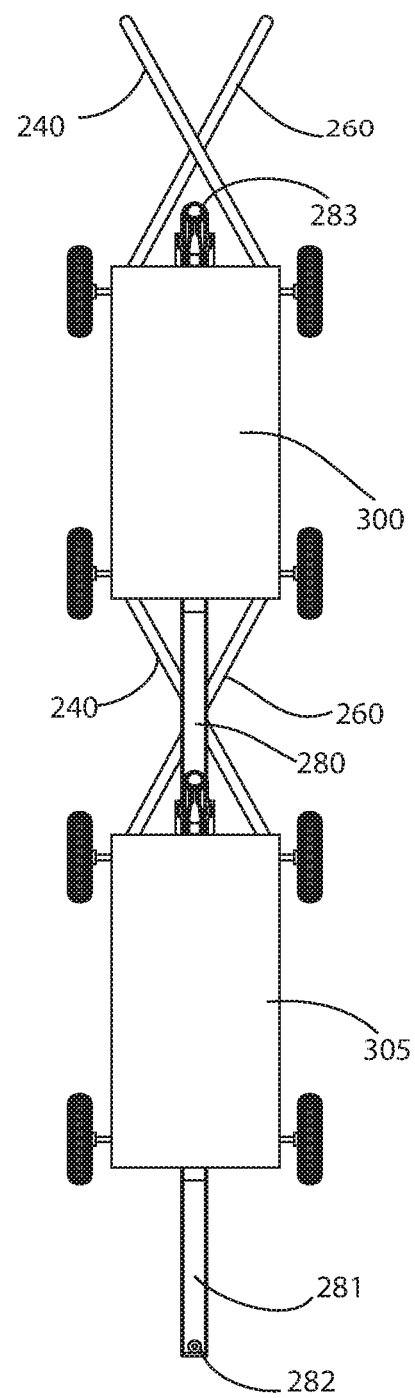
FIG. 9 provides a plan view of an exemplary train of vehicles (i.e., carts or carriages) having coupled axle assemblies for a trackless train vehicle according to principles of the invention.
Figure 10:
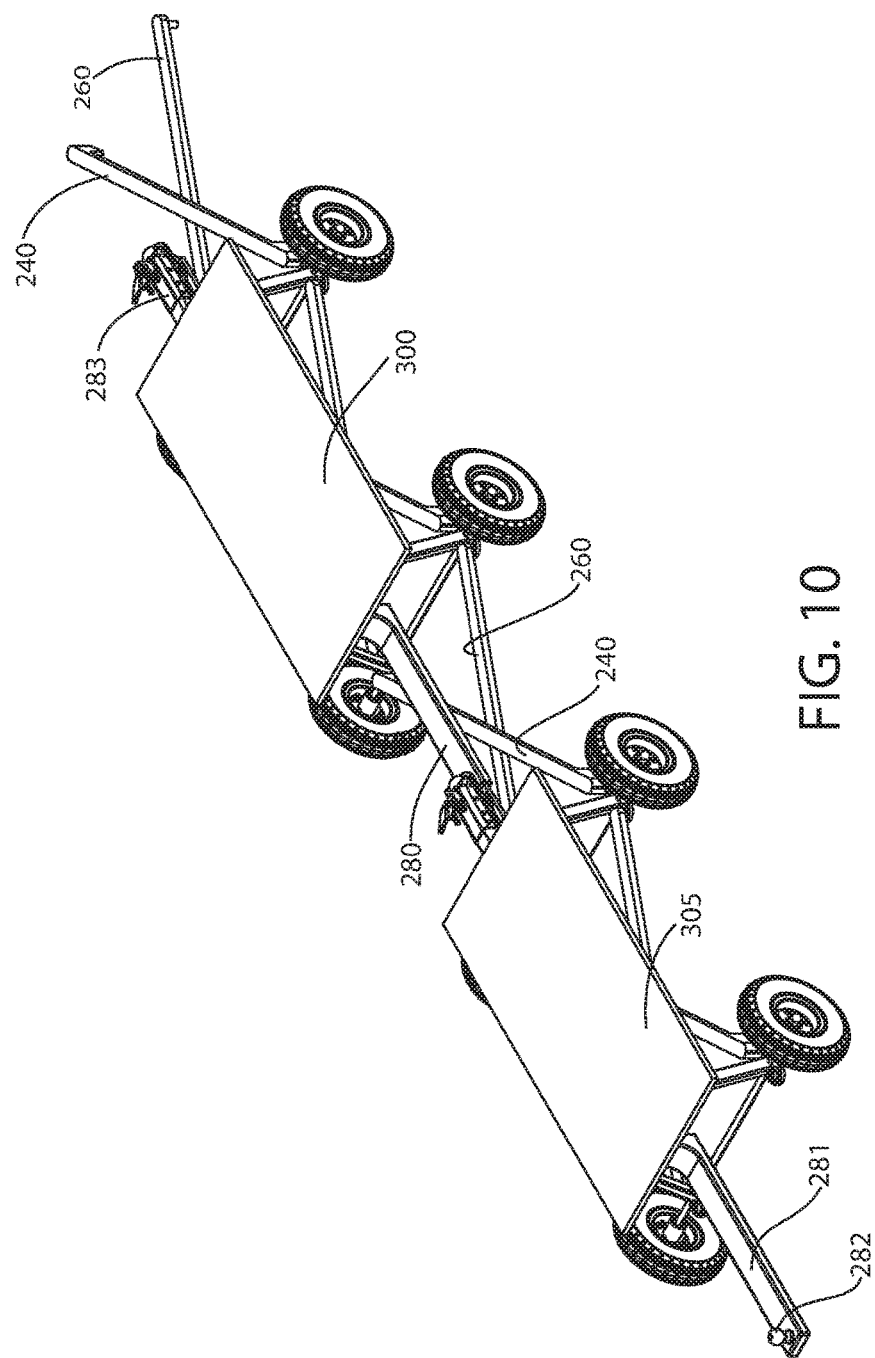
FIG. 10 provides a perspective view of an exemplary train of vehicles (i.e., carts or carriages) having coupled axle assemblies for a trackless train vehicle according to principles of the invention.
Figure 11:
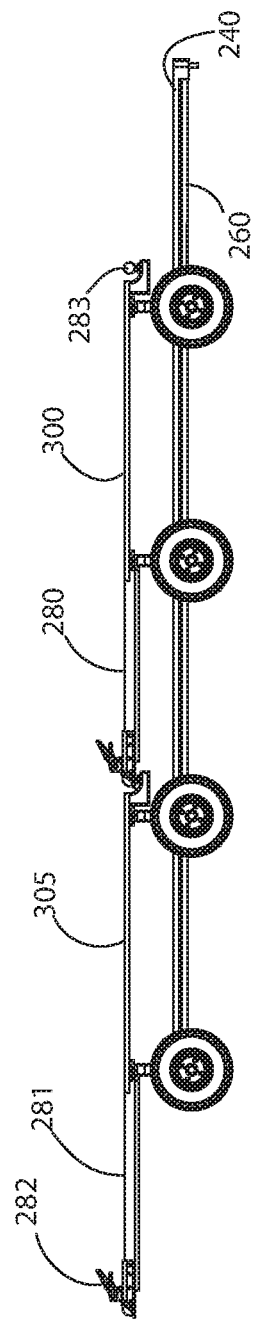
FIG. 11 provides a side view of an exemplary train of vehicles (i.e., carts or carriages) having coupled axle assemblies for a trackless train vehicle according to principles of the invention.

As shown in FIGS. 9, 10 and 11, separate carts 300, 301 may be hitched together with a pivoting tow hitch 280 positioned at an elevation that does not interfere with inter-cart cross members 240, 260, and jointed to allow movement of a towing cart relative to the towed cart. By way of example and not limitation, the hitch 280 may comprise a bar 281 and a tow ball 282, to allow swiveling, and a mating coupler with a socket 283, for receiving the tow ball 282. The invention is not limited to a particular type of hitch. The pivot point of the hitch 280 should be proximate to the pivot point of the axle assembly. Thus, the tow hitch 280 carries the load of pulling a cart, without interfering with pivoting rotation of axle assemblies.

Figure 12:
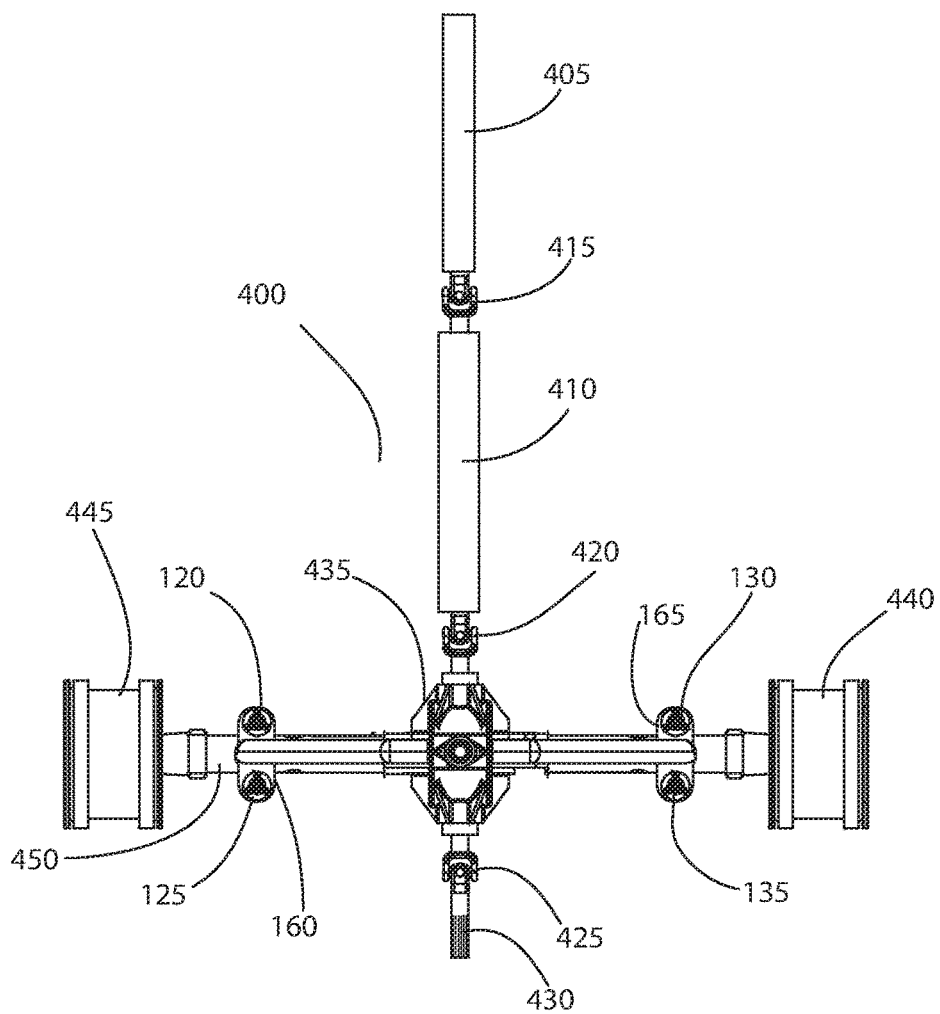
FIG. 12 provides a plan view of an exemplary axle assembly with a differential for a trackless train vehicle according to principles of the invention.
Figure 13:
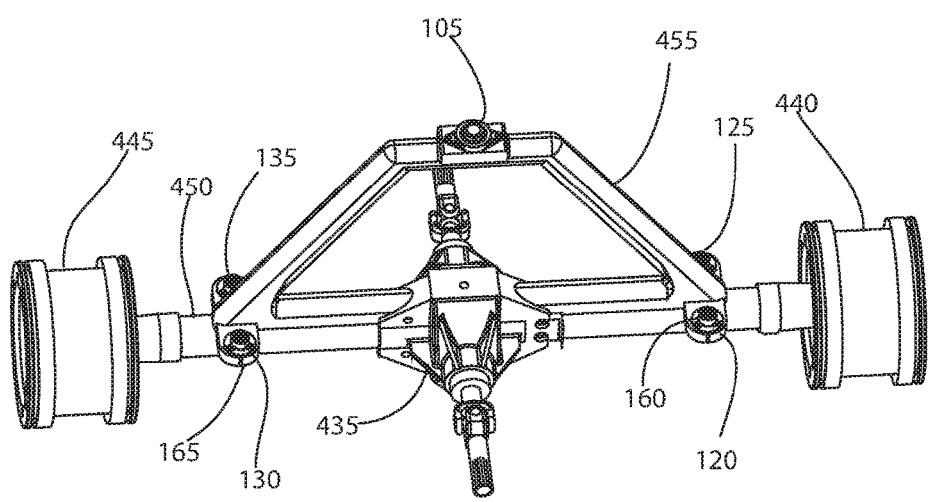
FIG. 13 provides a side view of an exemplary axle assembly with a differential for a trackless train vehicle according to principles of the invention.

FIGS. 12 and 13 provides views of another exemplary pivoting axle assembly 400 for a trackless train vehicle according to principles of the invention. In this embodiment, drive shafts 405, 410 and universal joints 415, 420, 425 transfer power to each such axle of a cart and to adjacent axles between carts. The differential 435 supplies power to one or both wheels 440, 445 of the assembly 400. The differential 435 includes an input and an output. The differential 435 is powered through the input side and transmits power from the output side. To allow linear translation between one or more universal joints and a mating drive shaft, an elongated splined (toothed) shaft 430 may be slidingly received in a mating female splined socket of a drive shaft 405, 410, allow limited relative sliding motion. Such sliding motion allows for altering distances between coupled axle assemblies, which may facilitate turning and suspension in rough terrain.

A pair of mounts 160, 165 support pivoting joints 120, 125, 130, 135. Each pivoting joint 120, 125, 130, 135 may couple to a cross member which imparts steering motion to the axle assembly from an adjacent axle and transmits steering motion to an adjacent axle assembly. Each joint 105, 120, 125, 130, 135 may comprise a hinge joint, such as a pivot pin, or a ball joint that consists of a bearing stud and socket enclosed in a casing, or some other joint that allows pivoting rotation in at least one plane, i.e., at least about one axis.

The axle assembly 400 includes a support 405 that couples a central pivot joint 105. The support 110 maintains the central pivot joint 105 at a determined elevation above the differential 435 and wheels 440, 445, to provide clearance. The central pivot joint 105 allows pivoting of the axle assembly 400, for steering, relative to the supported body of a cart.

Figure 14:
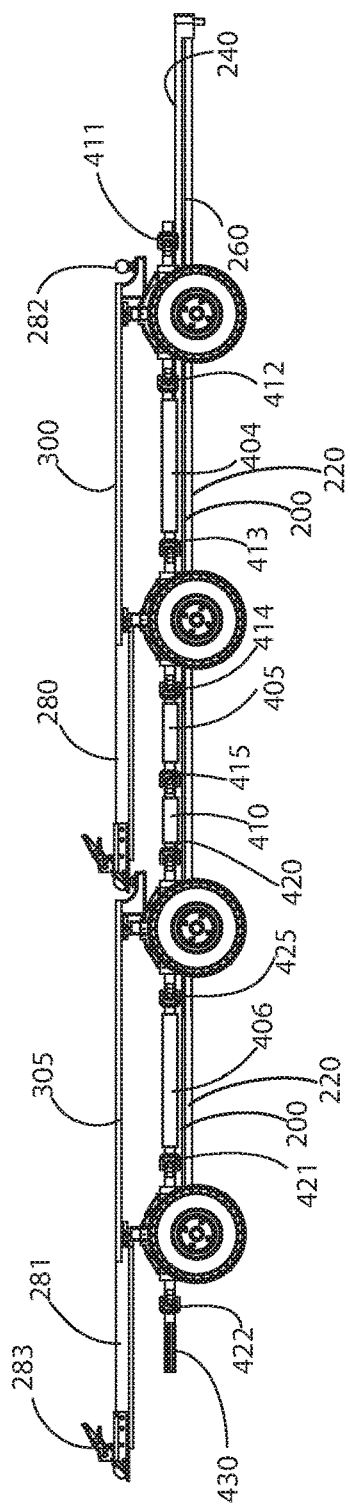
FIG. 14 provides a side view of an exemplary train of vehicles (i.e., carts or carriages) having coupled axle assemblies with differentials for a trackless train vehicle according to principles of the invention.

With reference to FIG. 14, an exemplary pair of carts with coupled axles is illustrated. Each cart 305, 300 includes two axle assemblies coupled by intra-cart cross members. Each intra-cart cross member, includes opposite coupling ends 205, 210, 225, 230 that connect to pivoting joints 120, 130, 125, 135. The joints include bearings to facilitate pivoting rotation. By way of example but not limitation, each joint may comprise a bearing flange block or a pillow block, and the mating end of a coupling may include a flange mounting surface or a pivot pin sized and shaped to be received in the pillow block. Other rotating joints, including pivot pins without bearings, may be utilized without departing from the scope of the invention. Each of the pair of cross members 200, 220 is at a different elevation from the other cross member to avoid interference. Thus, cross member 200 couples joint 120 of axle assembly 400 to joint 135 of axle assembly 101. Likewise, cross member 220 couples joint 125 of axle assembly 100 to joint 130 of axle assembly 101. In this manner, the distance between the coupled joints is maintained and each axle assembly pivots about its central pivot joint by an equal amount (degrees) but in opposite directions.

The central pivot joint 105 of each axle assembly is coupled to the body of the vehicle. The central pivot joint 105 is a rotating joint, such as a bearing flange block which can be attached to a structural surface of the body of the vehicle by a flange. The bearing facilitates pivoting rotation of the axle assembly about the central pivot joint 105.

The joints 120, 125 and 130, 135 are arranged in pairs, with 120 and 130 being equidistant from the central joint 105 and on the same side of the axle assembly, and 125 and 135 also being equidistant from the central joint 105 but on the opposite side of the axle assembly 100. In this manner, cross members may couple an axle assembly to two axle assemblies, to one axle assembly fore and another axle assembly aft. By way of example, as illustrated in FIG. 7, axle assembly 101 of cart 300 is coupled to axle assembly 100, also of cart 300, by intra-cart cross members 200, 220. Axle assembly 101 of cart 300 is coupled to axle assembly 102 of cart 301, by inter-cart cross members 240, 260. In this manner, a series of axle assemblies for a series of carts may be interconnected in a train.

Criss-crossing (i.e., crosswise) inter-cart cross members 240, 260 are key, as they transmit equal but opposite direction pivoting to an axle assembly of a succeeding cart. Thus, the right side of a rear axle assembly is coupled to the left side of a front axle assembly of a succeeding cart. The left side of a rear axle assembly is coupled to the right side of a front axle assembly of a succeeding cart. The radial distance from the longitudinal axis of rotation of the central pivot joint of the rear axle assembly and the point at which the coupling attaches to the right side of the rear axle assembly is the same as the radial distance from the longitudinal axis of rotation of the central pivot joint of the front axle assembly and the point at which the coupling attaches to the left side of the front axle assembly. Likewise, the radial distance from the longitudinal axis of rotation of the central pivot joint of the rear axle assembly and the point at which the coupling attaches to the left side of the rear axle assembly is the same as the radial distance from the longitudinal axis of rotation of the central pivot joint of the front axle assembly and the point at which the coupling attaches to the right side of the front axle assembly. This ensures pivoting rotation of the front axle assembly and the coupled rear axle assembly, by equal degrees of rotation but in opposite directions.

Criss-crossing intra-cart cross members 200, 220 are also key, as they transmit equal but opposite direction pivoting from a front axle assembly to a rear axle assembly of a cart. Thus, the right side of a rear axle assembly is coupled to the left side of a front axle assembly of the cart. The left side of a rear axle assembly is coupled to the right side of a front axle assembly of the cart. The radial distance from the longitudinal axis of rotation of the central pivot joint of the rear axle assembly and the point at which the coupling attaches to the right side of the rear axle assembly is the same as the radial distance from the longitudinal axis of rotation of the central pivot joint of the front axle assembly and the point at which the coupling attaches to the left side of the front axle assembly. Likewise, the radial distance from the longitudinal axis of rotation of the central pivot joint of the rear axle assembly and the point at which the coupling attaches to the left side of the rear axle assembly is the same as the radial distance from the longitudinal axis of rotation of the central pivot joint of the front axle assembly and the point at which the coupling attaches to the right side of the front axle assembly. This ensures pivoting rotation of the front axle assembly and the coupled rear axle assembly, by equal degrees of rotation but in opposite directions, for the cart.

Drive shafts 404, 405, 406, 410, transmit torque between differentials of each the axle assemblies 400. Universal joints 411, 412, 413, 414, 415, 420, 421, 422, 425, and splined shafts 430 allow pivoting and limited translational linking of the interconnected shafts 404, 405, 406, 410.

The carts 300, 305 are hitched together with a pivoting tow hitch 280 positioned at an elevation that does not interfere with inter-cart cross members 240, 260, and jointed to allow movement of a towing cart relative to the towed cart. By way of example and not limitation, the hitch 280 may comprise a bar 281 and a tow ball 282, to allow swiveling, and a mating coupler with a socket 283, for receiving the tow ball 282. The invention is not limited to a particular type of hitch. The pivot point of the hitch 280 should be proximate to the pivot point of the axle assembly. Thus, the tow hitch 280 carries the load of pulling a cart, without interfering with pivoting rotation of axle assemblies.

Figure 15:
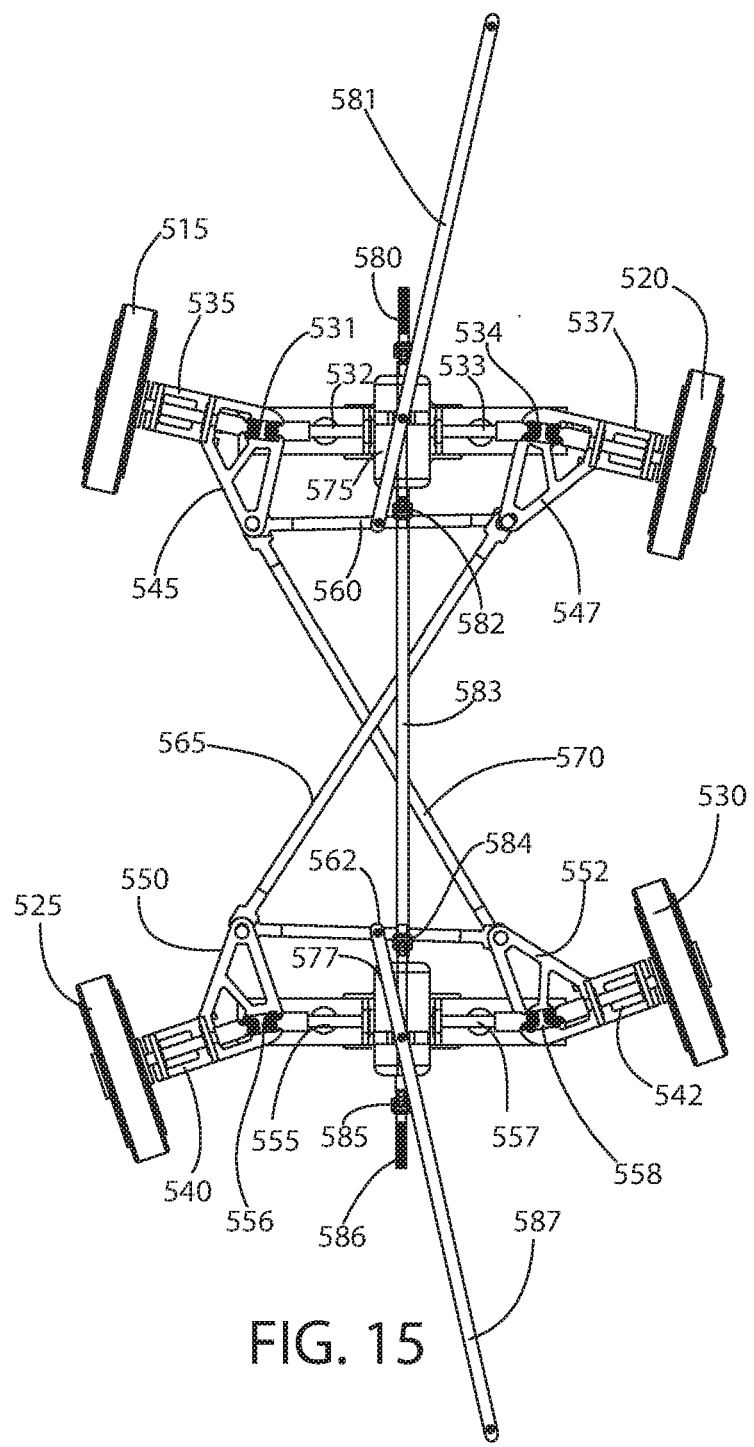
FIG. 15 provides a plan view of an exemplary axle assembly with a plurality of steering arms, differentials and drive shafts for a trackless train vehicle according to principles of the invention.

FIG. 15 provides a plan view of an exemplary axle assembly with a plurality of steering arms, differentials and drive shafts for a trackless train vehicle according to principles of the invention. In this embodiment, each axle assembly (i.e, the front and rear axle assemblies) include pivoting steering arms 545, 547, 550, 552. Opposite arms 545, 547 are coupled by tie rod 560. Opposite arms 550, 552 are coupled by tie rod 562. Thus, pivoting motion of one arm causes pivoting motion of the opposite arm. A pair of crosswise couplings 565, 570 couple the front left arm 545 to rear right arm 552 and the front right arm 547 to the rear left arm 550. The crosswise couplings 565, 570, may be replaced with cable assemblies, such as, but not limited to the cable assemblies described below with reference to FIGS. 19-21.

In the embodiment shown in FIG. 15, each wheel receives power from a differential 575, 577. Each differential includes an input shaft 580, 584, which may be splined for mating engagement with a corresponding drive shaft, and an output shaft 582, 585, which may be also be splined for mating engagement with a corresponding drive shaft. The output shaft 582 of the front differential 580 is coupled to the input shaft 584 of the rear differential by a drive shaft 583, which may be a single shaft segment or a plurality of coupled shaft segments. Thus, power supplied to the input shaft 580 of the front differential 575 drives the drive shaft 583 which transfers power to the input of the rear differential 577.

Each wheel 515, 520, 525, 530 is attached to a neck 535, 537, 540, 542 of the corresponding steering arm 545, 547, 550, 552. The wheels 515, 520, 525, 530 are coupled to the differentials 575, 577 by constant velocity joints 532, 533, 555, 557, each having a universal joint 531, 534, 556, 558 at the pivot point of the steering arm, 545, 547, 550, 552. Each constant velocity joint 532, 533, 555, 557 transmits power through a variable angle, at a rotational speed determined by the differential, without an appreciable increase in friction or play.

In a preferred embodiment, each differential 575, 577 is an automotive differential (e.g., an open differential, limited slip differential, or locking differential) that allows the outer drive wheel to rotate faster than the inner drive wheel during a turn. This is advantageous when the cart turns, making the wheel that is traveling around the outside of the turning curve roll farther and faster than the other. The average of the rotational speed of the two driving wheels equals the input rotational speed of the drive shaft. An increase in the speed of one wheel is balanced by a decrease in the speed of the other.

The embodiment of FIG. 15 also includes an input pivoting coupling 581 and an output pivoting coupling 587, each of which is a drawbar. The input pivoting coupling pivots about a pivot pin 582 at or near the front differential. A proximal end 583 of the pivoting coupling 581 connects to the tie rod 560 via a pivot pin 584. Thus, pivoting motion of the input pivoting coupling 581 about pivot pin 582, causes side to side motion of the tie rod 560 along a generally circular path, which causes pivoting motion of the steering arms 545, 547. The input pivoting coupling 581 may be the output steering coupling of the previous coupled cart. In this manner, steering forces from the rear steering mechanism of the previous cart are transmitted to this cart.

Similarly, the output pivoting coupling 587 pivots about a pivot pin 588 at or near the rear differential. A proximal end 589 of the pivoting coupling 587 connects to the tie rod 562 via a pivot pin 590. Thus, motion of the tie rod 562 causes pivoting motion of the output pivoting coupling 587 about pivot pin 588. The output pivoting coupling 587 serves as the input steering coupling of the next coupled cart.

In this manner, steering forces from the rear steering mechanism of this cart are transmitted to the next cart.

Figure 16:
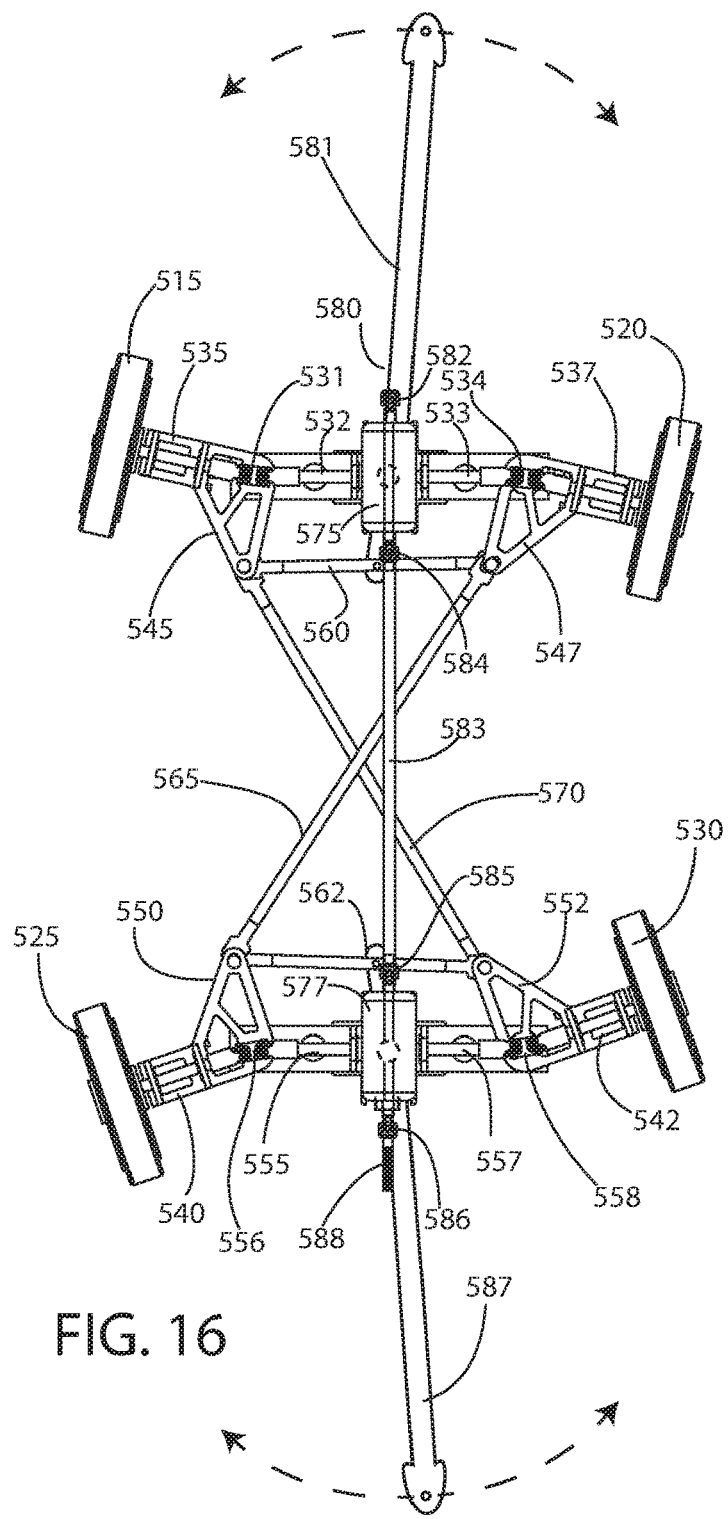
FIG. 16 provides a plan view of another exemplary axle assembly with a plurality of steering arms, differentials and drive shafts for a trackless train vehicle according to principles of the invention.

FIG. 16 provides a plan view of another exemplary axle assembly with a plurality of steering arms, differentials and drive shafts for a trackless train vehicle according to principles of the invention. In this embodiment, the input pivoting coupling 581a and an output pivoting coupling 587a are located below the differential, instead of above the differential as shown in FIG. 15. The components must be spaced to avoid rubbing, blocking and impeding movement. The invention is not limited to a particular elevational arrangement of components so long as the components are arranged to provide adequate ground clearance and to avoid rubbing, blocking and impeding movement.

Figure 17:
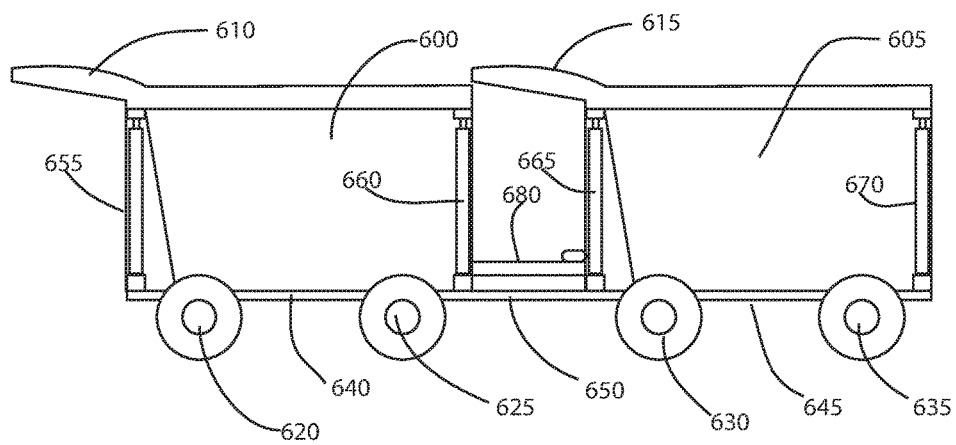
FIG. 17 provides a side view of exemplary coupled trackless train carts for a trackless train vehicle according to principles of the invention.

FIG. 17 provides a side view of exemplary coupled trackless train carts 600, 605 for a trackless train vehicle according to principles of the invention. In FIG. 17, a pair of coupled carts for a trackless train are illustrated. The carts may employ any of the various axle assemblies described above. A coupling 650 (e.g., crosswise pair or pivoting arm) extends between the carts to impart steering forces between adjacent axles. Crosswise couplings 640, 645 also extend between front and rear axles of each cart. The wheels 620, 625, 630, 635 may be powered by differentials or not powered. A hitch 680 or other pivoting mechanical coupling may join the coupled carts.

Figure 18:
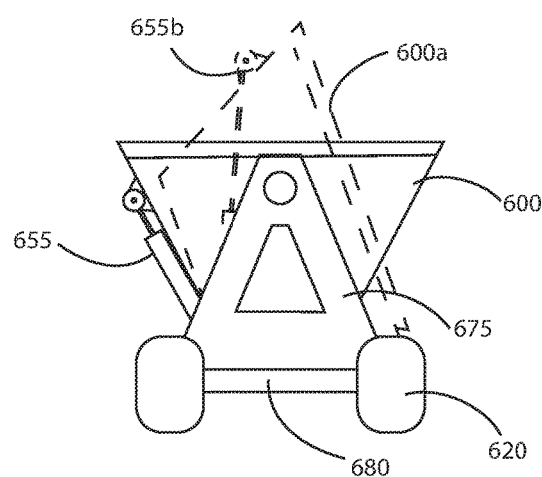
FIG. 18 provides a front view of exemplary coupled trackless train carts with a tipping mechanism for a trackless train vehicle according to principles of the invention.

In the embodiment shown in FIG. 17, each cart is a gondola cart, with a pivoting receptacle to facilitate emptying, as illustrated in FIG. 18. One or more hydraulic cylinders 655, 660, 665, 670 enable pivoting of the receptacle.

FIG. 18 provides a front view of exemplary coupled trackless train carts with a tipping mechanism for a trackless train vehicle according to principles of the invention.

FIG. 19 provides a plan view of an exemplary cable assembly for an axle assembly with a plurality of steering arms, differentials and drive shafts for a trackless train vehicle according to principles of the invention.

FIG. 20 provides a side view of an exemplary cable assembly for an axle assembly with a plurality of steering arms, differentials and drive shafts for a trackless train vehicle according to principles of the invention.

FIG. 21 provides a perspective view of an exemplary cable assembly for an axle assembly with a plurality of steering arms, differentials and drive shafts for a trackless train vehicle according to principles of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A trackless train comprising
a plurality of carts, including a first cart and a second cart, each cart including a pair of axle assemblies, including a first axle assembly and a second axle assembly, each of said first and second axle assemblies having a right side and a left side, said second axle assembly being aligned with and spaced apart from the first axle assembly, a pair of intra-cart crosswise steering couplings from the first axle assembly to the second axle assembly, the intra-cart crosswise steering couplings transmitting pivoting steering motion between the left side of the first axle assembly and the right side of the second axle assembly, and between the right side of the first axle assembly and the left side of the second axle assembly, and each axle assembly of each pair of axle assemblies comprising a pivoting central joint, each axle assembly pivoting about said pivoting central joint; and a pair of inter-cart crosswise steering couplings from the second axle assembly of the first cart of the plurality of carts to the first axle assembly of the second cart of the plurality of carts, the inter-cart crosswise steering couplings transmitting pivoting steering motion between the left side of the first axle assembly of the second cart and the right side of the second axle assembly of the first cart, and between the right side of the first axle assembly of the second cart and the left side of the second axle assembly of the first cart, the inter-cart crosswise steering couplings being between a first elevation and a second elevation; and a drawbar extending from the first cart to the second cart, the drawbar being at a third elevation, the third elevation not being between the first elevation and the second elevation;

wherein each of the first axle assembly and a second axle assembly includes a differential, an input joint, and a power takeoff, and the trackless train further comprising a drive shaft assembly extending from the power takeoff of the first axle to the input joint of the second axle, the drive shaft assembly including a linearly adjustable spline and a universal joint, the drive shaft assembly being at a third elevation, the third elevation being different from the first elevation and the second elevation.

\* \* \* \* \*